United States Patent [19]
Gui et al.

[11] Patent Number: 6,153,284
[45] Date of Patent: Nov. 28, 2000

[54] MAGNETIC RECORDING MEDIUM WITH HIGH NON-OPERATIONAL SHOCK RESISTANCE

[75] Inventors: Jing Gui, Fremont; Bruno Jean Marchon, Palo Alto, both of Calif.; Zine-Eddine Boutaghou, Vadnais Heights; Roger A. Resh, Prior Lake, both of Minn.; Joseph Cheng-Tsu Liu, Ulu Pandan, Singapore

[73] Assignee: Seagate Technology LLC, Scotts Valley, Calif.

[21] Appl. No.: 09/193,250

[22] Filed: Nov. 17, 1998

Related U.S. Application Data

[60] Provisional application No. 60/067,683, Dec. 12, 1997.

[51] Int. Cl.$^7$ .................................................. G11B 5/71
[52] U.S. Cl. .................. 428/141; 428/65.3; 428/694 TR; 428/694 SG; 428/900; 360/135; 360/97.01; 427/129; 427/131; 427/554
[58] Field of Search ..................... 428/141, 65.3, 428/694 TR, 694 SG, 900; 360/135, 97.01; 427/131, 129, 554

[56] References Cited

U.S. PATENT DOCUMENTS

| | | |
|---|---|---|
| 5,550,696 | 8/1996 | Nguyen . |
| 5,742,518 | 4/1998 | Gui et al. ................................ 364/508 |
| 5,949,612 | 9/1999 | Gudeman et al. ................... 360/97.01 |
| 5,976,714 | 11/1999 | Arita et al. ......................... 428/694 TR |
| 6,007,896 | 12/1999 | Bhushan .................................. 428/141 |

OTHER PUBLICATIONS

"Overcoats and Lubrication for Thin Film Disks", A.M. Homola, et al., MRS Bulletin, Mar. 1990, pp. 45–52.

"Application of Disjoining and Capillary Pressure to Liquid Lubricant Films in Magnetic Recording", C. Mathew Mate, J. Appl. Phys. 72 (7), Oct. 1, 1992, pp. 3084–3090.

"A Stiction Model for a Head–disk Interface of a Rigid Disk Drive", J. Gui, et al., J. Appl. Phys. 78 (6), Sep. 15, 1995, pp. 4206–4217.

*Primary Examiner*—Stevan A. Resan
*Attorney, Agent, or Firm*—McDermott, Will & Emery

[57] ABSTRACT

Non operational shock resistance is achieved by preventing separation of the read/write head from the disk. Embodiments include optimizing the normal stiction force of a lubricant topcoat by controlling the texture geometry of the landing zone and lubricant topcoat thickness, particularly the density of protrusions. Laser textured landing zones having a protrusion density above about 4,500 protrusions/$mm^2$ can provide an optimal normal stiction force in excess of 25 gf per interface and a lateral stiction force below 10 gf per interface.

17 Claims, 3 Drawing Sheets

MAGNETIC RECORDING MEDIUM WITH HIGH NON-OPERATIONAL SHOCK RESISTANCE

RELATED APPLICATION

This application claims priority from Provisional Application No. 60/067,683 filed on Dec. 12, 1997, entitled "A Media Design to Improve Disc Drive Non-Operation Shock Resistance", the entire disclosure of which is incorporated by reference herein.

FIELD OF THE INVENTION

The present invention relates to a magnetic recording system with high non-operational shock resistance. The present invention is particularly applicable to portable magnetic recording systems subject to shock.

BACKGROUND ART

Conventional magnetic disk drive designs comprise a commonly denominated contact start-stop (CSS) system commencing when the head begins to slide against the surface of the disk as the disk begins to rotate. Upon reaching a predetermined high rotational speed, the head floats in air at a predetermined distance above the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerates from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each head as close to its associated recording surface as possible, i.e., to minimize the flying height of the head. Thus, a smooth recording surface is preferred, as well as a smooth opposing surface of the associated head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction. If limited torque provided by a drive's motor cannot overcome this stiction, the drive will fail to spin up. In addition, a flat-to-flat contact also gives rise to excessive friction during the start up and stopping phases, thereby causing wear to the head and recording surfaces eventually leading to what is referred to as a "head crash." Thus, there are competing goals of reduced head/disk stiction/ friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

A typical longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorous (NiP). Alternative substrates include glass, ceramic, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12' a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective carbon overcoat 13, 13' are usually deposited by sputtering techniques performed in an apparatus containing sequential deposition chambers. A conventional Al-alloy substrate is provided with a NiP plating, primarily to increase the hardness of the Al substrate, serving as a suitable surface for polishing to provide a texture which is substantially reproduced on the disk surface.

A conventional disk drive comprising a disk with a textured landing zone, such as that disclosed in Nguyen, U.S. Pat. No. 5,550,696, is schematically illustrated in FIG. 2. For illustrative convenience and ease of explanation, the disk drive depicted in FIG. 2 is shown with a single recording head and associated disk surface; however, conventional disk drives typically comprise multiple heads and multiple disks. The depicted disk drive comprises a base 20 to which are secured a disk drive motor with a rotatable spindle 21 and a head actuator 22. A magnetic recording medium (disk) 23 is connected to spindle 21 and rotated by the drive motor.

The disk 23 is typically a thin film disk, such as that illustrated in FIG. 1. A read/write head or transducer 24 is affixed under the trailing end of an air-bearing slider 25. Transducer 24 can be an inductive read/write transducer or an inductive write transducer with a magnetoresistive (MR) read transducer formed by conventional film deposition techniques. Slider 25 is connected to actuator 22 by rigid arm 26 and suspension 27 which provides a biasing force urging slider 25 onto the surface of recording disk 23. During operation of the disk drive, the drive motor rotates disk 23 at a constant speed, and actuator 22 pivots on shaft 28 to move the slider 25 generally radially across the surface of disk 23, so that the read/write transducer 25 can access different data tracts on disk 23. Actuator 22 is typically a rotary voice coil motor (VCM) having a coil 29 that moves through the fixed magnetic field of magnet assembly 200 when current is applied to the coil. The data detected from disk 23 by transducer 24 are processed into a data read back signal by signal amplification and processing circuitry in the integrated circuit chip 201 on arm 26. The signals from transducer 24 travel via flex cable 202 to chip 201 which outputs the signals via cable 203. A dedicated textured landing zone 204 is typically formed by laser texturing near the disk inside diameter away from the smooth disk data region 205. When the disk drive motor is stopped, slider 25 is in contact with the textured surface of landing zone 204.

A key performance requirement for a disk drive, particularly in mobile computing applications, is non-operational shock resistance. A sudden deceleration of a disk drive, which may occur when a computer is subjected to shock during an accident, can cause the read/write heads to separate from disks and subsequently impact on the disks, thereby damaging the disks. The severity of shock is typically proportional to the amount of deceleration a disk drive experiences.

Accordingly, a need exists for improved disk drives having non-operational shock resistance. A particular need exists for improved disk drives having non-operational shock resistance achieved by preventing the separation of the head from the disk.

DISCLOSURE OF THE INVENTION

A object of the present invention is a disk drive having non-operational shock resistance.

Another object of the present invention is a disk drive having non-operational shock resistance by preventing separation of the head from the disk.

Another object of the present invention is a magnetic recording medium manufactured to prevent separation from the disk, without a high preload, during shock, and a method of manufacturing the magnetic recording medium.

Additional objects, advantages and other features of this invention will be set forth in the description which follows and in part will become apparent to those having ordinary skill in the art upon examination of the following or may be learned from the practice of the invention. The objects and advantages of the invention can be realized and obtained as particularly pointed out in the appended claims.

According to the present invention, the foregoing and other objects are achieve in part by a magnetic recording medium comprising: a lubricant topcoat; and a textured landing zone comprising a plurality of protrusions, wherein the lubricant has a normal stiction force in the textured landing zone greater than about 25 gf per interface and a lateral stiction force in the textured landing zone less than about 10 gf per interface.

A further aspect of the present invention is disk drive comprising: a read/write head; and a magnetic recording medium comprising: a lubricant topcoat; and a textured landing zone comprising a plurality of protrusions, wherein the lubricant has a normal stiction force in the textured landing zone greater than about 25 gf per interface and a lateral stiction force in the textured landing zone less than about 10 gf per interface.

Another aspect of the present invention is a method of manufacturing a magnetic recording medium, the method comprising: laser texturing a non-magnetic substrate to form a landing zone comprising a plurality of protrusions; and depositing a lubricant topcoat, whereas the lubricant has a normal stiction force in the textured landing zone greater than about 25 gf per interface and a lateral stiction force in the landing zone less than about 10 gf per interface.

Additional objects and advantages of the present invention will become readily apparent to those skilled in this art from the following detailed description, wherein embodiments of the invention are described simply by way of illustration of the best mode contemplated for carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

DESCRIPTION OF THE INVENTION

Figure 1:
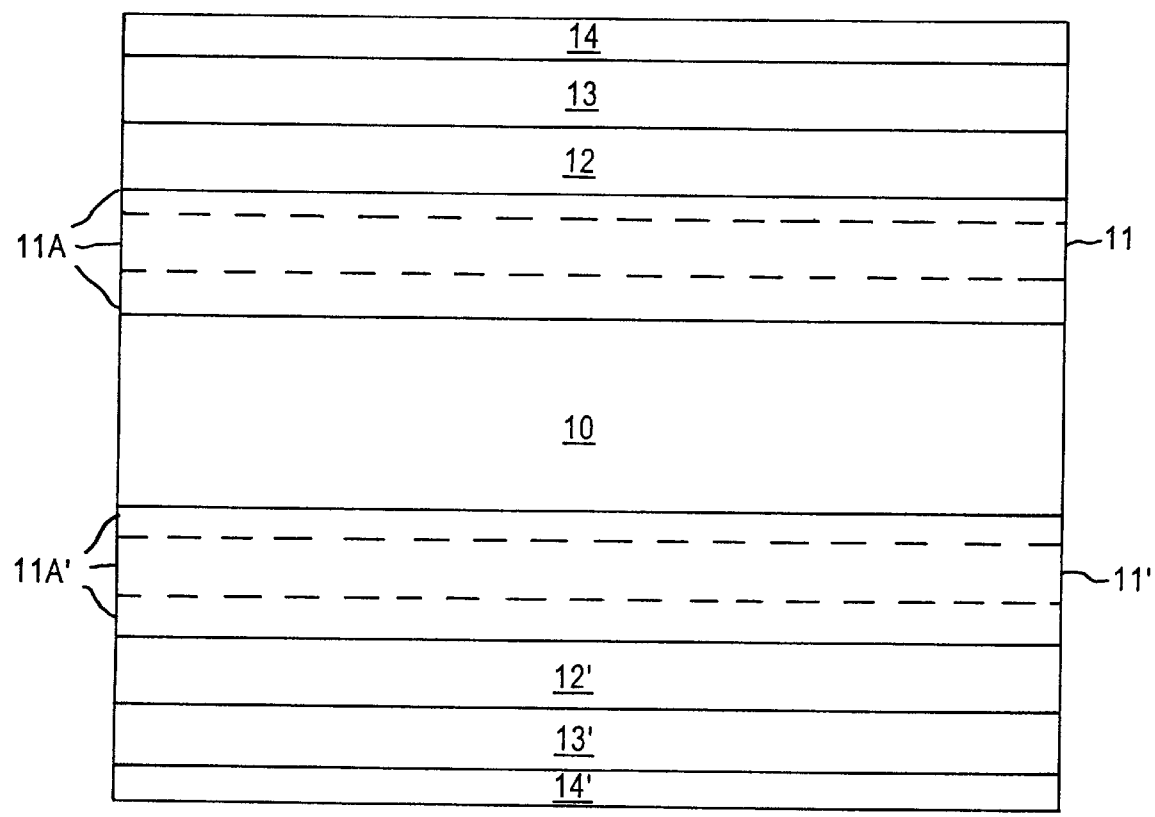
FIG. 1 schematically depicts a conventional magnetic recording medium.
Figure 2:
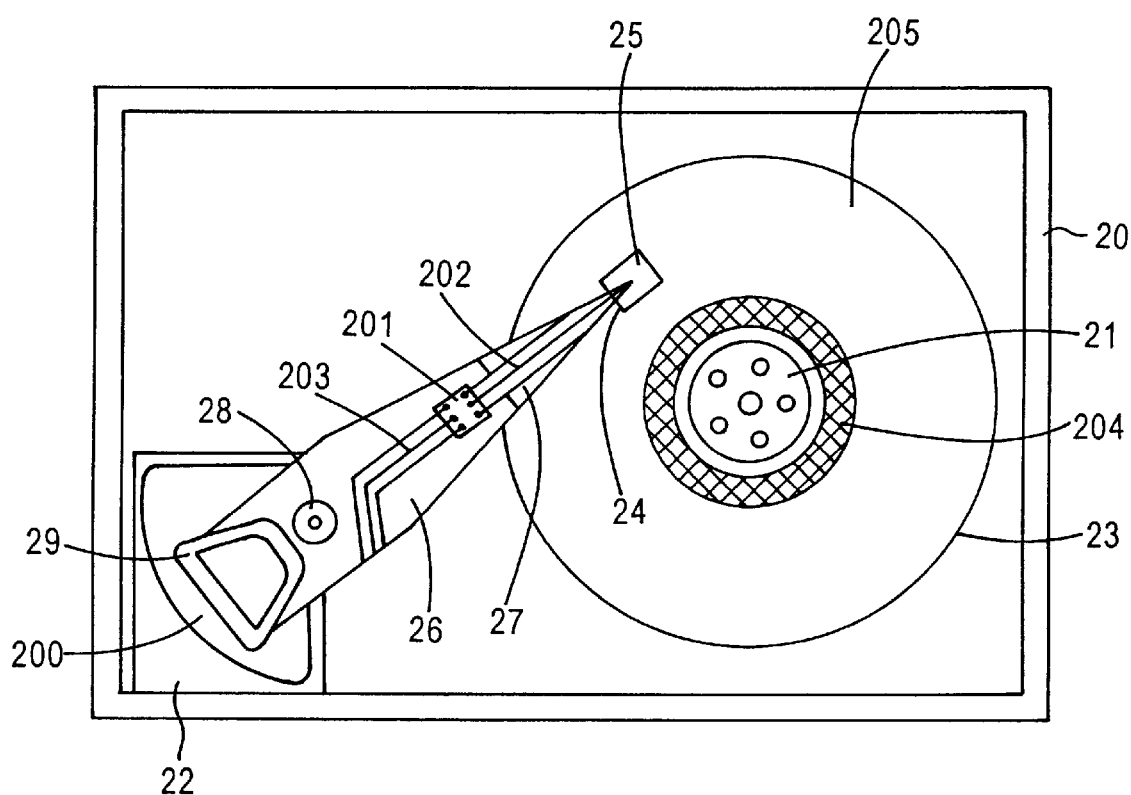
FIG. 2 schematically illustrates a conventional contact stop/start disk drive including a disk with a textured band serving as the landing zone.

The present invention addresses and solves the non-operational shock resistance problem attendant upon conventional disk drives, which problem is particularly acute in mobile computing applications wherein a computer can be subject to a shock, as during an accident, resulting in read/write heads separating from disks and subsequently impacting on and damaging the disks. This problem can be addressed by a number of techniques, as by increasing disk stiffness, installing head snubbers, shortening the head suspension, and increasing head preload. Most of such techniques, except increasing the head preload, minimize the impact of the head on the disk during shock. However, it is more advantageous to prevent separation of the head from the disk. An increase the head preload can alleviate the problem by maintaining the head and disk together during a shock. However, a high head preload disadvantageously leads to excessive wear on the disk when the disk takes off and lands during CSS operation, because the frictional energy is directly proportional to the head preload. In fact, the head preload can not be significantly greater than 4.0 gf per interface without excessive disk wear.

When a disk drive is not in operation (as when the power is down), the read/write heads rest on disk surfaces in the landing zone. As soon as a head lands in the landing zone, the liquid lubricant topcoat ,typically applied on the disk surface to minimize wear, starts to form menisci around contacting asperities. As a result, an additional force is generated, the meniscus force, that pulls the head down toward the disk surface. This phenomenon is known as stiction of head-disk interface. See, for example, J. Gui et al., J. Appl. Phys. 78, pages 4206–4217 (1995), C. M. Mate J. Appl. Phys., 72, pages 3084–3090 (1992); and A. M. Homola, MRS Bulletin, March 1990, pages 45–52. Excessive stiction, however, can lead a disk drive to fail, as the motor may not have sufficient strength to initiate disk rotation. To overcome the stiction problem, a textured landing zone is provided to reduce the real area of contact between the slider and the disk and, hence, reduce the meniscus force.

After extensive experimentation and investigation, it was found that a head-disk interface exhibiting high stiction also exhibits superior shock resistance. It is believed that the meniscus force, which can be considerably higher than the head preload, contributes to preventing separation of the head from the disk. The present invention, therefore, strategically utilizes the meniscus force to improve shock resistance of the disk drive, while controlling the meniscus force to avoid spin failure.

In accordance with embodiments of the present invention, the stiction level is elevated, but controlled, at the head-disk interface to prevent head-disk separation during a non-operational shock. The present invention is particularly applicable to disk drive designs having a higher relative spin-up power, i.e., high per interface torque level. In accordance with embodiments of the present invention, an elevated stiction level is achieved by proper media design including a strategic combination of laser textured landing zone geometry, e.g., protrusion density, diameter and height, and thickness of the lubricant topcoat. Embodiments of the present invention include controlling the lubricant topcoat thickness and laser texture geometry to achieve a meniscus force, i.e., normal stiction force, in excess of about 25 gf per interface to maintain contact between the head and disk during an accidental shock while, at the same time, providing a lateral stiction component, required to be overcome during a power up, below about 10 gf per interface, which lateral stiction force is well within the capability of conventional motors typically employed in mobile and desk-top disk drives.

After a disk drive spins, all the menisci formed when the heads rest on disks are destroyed. As a result, there is no longer any meniscus force (normal stiction component) at the interface when spinning starts. The normal force is simply the head preload. Manifestly, there is no meniscus force at the interface during landing. Thus, the meniscus force employed in the present invention does not make the interface less durable during contact start/stop cycles. Accordingly, the use of the meniscus force i.e., normal stiction force, to improve the nonoperational shock resistance is more advantageous than increasing the head preload.

The protrusion density in the landing zone is a significant parameter in achieving the objectives of the present invention, i.e., elevating the normal stiction force while maintaining a desirably low lateral stiction force. If a high normal stiction force is achieved by simply lowering the bump height and/or increasing the thickness of the lubricant topcoat, the interface is very close to the stiction avalanche point, so that a minor deviation from the design point can result in catastrophic stiction failure. However, by increasing by the protrusion or bump density, typically above about 4,500 protrusions/mm$^2$, the stiction floor level is elevated such that a relatively wide and flat stiction region is provided.

Given the guidance and the disclosed objectives of the present invention, the precise geometrical configuration of the textured landing zone and lubricant topcoat thickness can be optimized in a particular situation to achieve a sufficiently high normal stiction force to prevent separation of the head and disk as a result of accidental shock, and to provide a sufficiently low lateral stiction force within the capability of conventional motors to initiate CSS operation. For example, it was found suitable to provide a normal stiction force of about 25 to about 50 gf per interface and a lateral stiction force of about 10 to about 10 gf per interface. These objectives can be achieved by laser texturing a landing zone to provide a protrusion density of about 1,600 to about 40,000 protrusions per mm$^2$, e.g., 4,500 to 40,000 protrusions/mm$^2$. Embodiments of the present invention comprise laser texturing a disk substrate to form a textured landing zone comprising protrusions having a diameter of about 3 $\mu$m to about 15 $\mu$m e.g., about 3 $\mu$m to about 8 $\mu$m, and a protrusion height extending about the surface of the textured landing zone less than about 200 Å, e.g., less than about 150 Å. In accordance with the present invention, a lubricant topcoat can be provided at a thickness of about 15 Å to about 40 Å, e.g., about 20 Å to about 30 Å.

As in conventional practices, magnetic recording media formed in accordance with embodiments of the present invention typically comprise a non-magnetic substrate having a laser textured landing zone which is substantially reproduced on layers subsequently deposited thereon. The magnetic recording media produced in accordance with the embodiments of the present invention comprise layers typically employed in manufacturing magnetic recording media, such as an underlayer deposited on the non-magnetic substrate, a magnetic layer deposited on the underlayer, and a carbon-containing protective overcoat deposited on a magnetic layer. The underlayer, magnetic layer and protective overcoat are typically deposited by sputter deposition techniques. The lubricant topcoat is conventionally applied to the protective overcoat.

Figure 3:
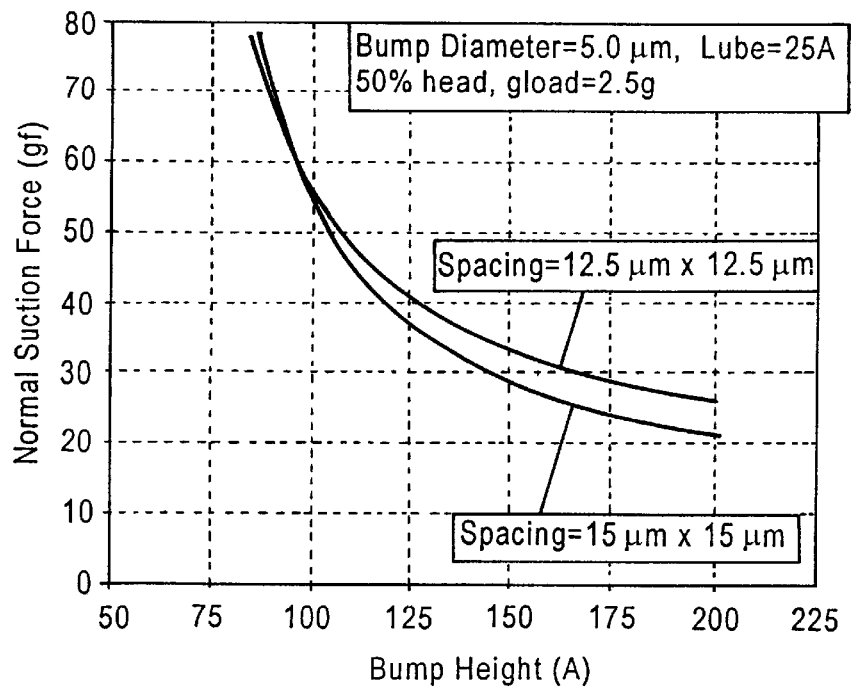
FIG. 3 illustrates the normal stiction force as a function of laser protrusion height for two different protrusion densities.
Figure 4:
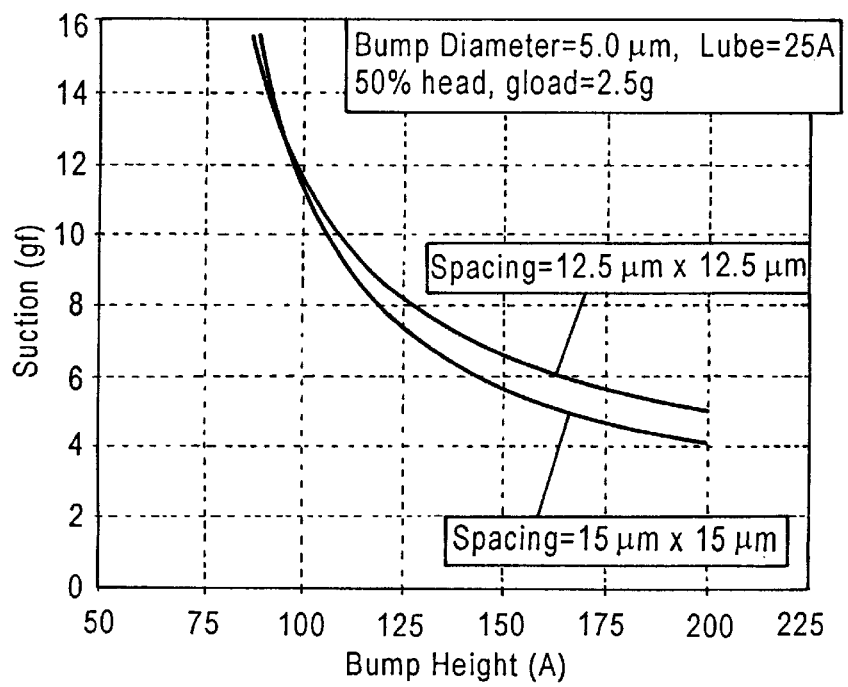
FIG. 4 illustrates the lateral stiction force as a function of laser protrusion height for two different protrusion densities.

The advantages of the present invention are illustrated in FIGS. 3 and 4 which contain plots of normal (FIG. 3) and lateral (FIG. 4) stiction forces as a function of laser protrusion (bump) height for two different bump densities. The calculation is based on 50% head with a g load of 2.5 g, 5.0 $\mu$m bump diameter and 25 Å lubricant topcoat thickness. By providing a bump diameter about 5.0 $\mu$m, bump density of about 5,000 bumps per mm$^2$, bump height of about 150 Å and a lubricant topcoat thickness of about 25 Å, to work with a specified head design (50% 2.5 g load), non-operational shock resistance in excess of 25 gf per interface is obtained, while maintaining a lateral suction force below about 10 gf per interface.

In practicing the present invention, the substrate can be any substrate typically employed in the manufacture of magnetic recording media, such as a metal substrate or an alternate substrate comprising a glass, ceramic or glass-ceramic material. Other conventional substrates include Al alloy substrates with a coating thereon, such as NiP.

Magnetic layers deposited in accordance with the present invention can be any of those conventionally employed in the production of magnetic recording media. Such conventional magnetic layers include, but are not limited to, cobalt alloys. As in conventional practices, one or more underlayers can be deposited on the textured substrate prior to depositing magnetic layer. The underlayer can comprise Cr or a Cr alloy, such as chromium-vanadium or chromium-titanium, oxygen-doped chronium, tungsten or a tungsten alloy.

Laser texturing and controlling the laser textured geometry can be conducted as in accordance with conventional practices. Suitable controllable laser texturing techniques include those disclosed in copending PCT Application No. PCT/US 96/96830, copending Application Ser. No. 08/796, 830 filed Feb. 7, 1997, now U.S. Pat. No. 5,714,207 issued Feb. 3, 1998; copending application Ser. No. 08/954,585 filed Oct. 20, 1997, now U.S. Pat. No. 5,952,058 issued Sep. 14, 1999; copending PCT Application PCT/US96/06829, copending application Ser. No. 08/666,374 filed on Jun. 27, 1996 now U.S. Pat. No. 5,968,608 issued Oct. 19, 1999; and copending application Ser. No. 08/647,407 filed on May 9, 1996, now U.S. Pat. No. 5,783,797 issued Jul. 28, 1998 the entire disclosures of which are hereby incorporated herein by reference.

The present invention advantageously utilizes the meniscus force to prevent separation of heads from disks, thereby advantageously improving non-operational shock resistance without requiring a high head preload. The present invention can be employed to produce any of various types of magnetic recording media and disk drives. The present invention is particularly applicable to disk drives for use in mobile computing applications. The present invention can be employed to produce any of various types of magnetic recording media, including high areal density magnetic recording media.

Only the preferred embodiment of the invention and but a few examples of its versatility are shown and described in the present application. It is to be understood that the invention is capable of use in various other combinations and environments and is capable of changes or modifications within the scope of the inventive concept as disclosed therein.

What is claimed is:

1. A magnetic recording medium comprising:

a lubricant topcoat; and a textured landing zone comprising a plurality of protrusions, wherein the lubricant has a normal stiction force in the textured landing zone greater than about 25 gf per interface and a lateral stiction force in the textured landing zone less than about 10 gf per interface.

2. The magnetic recording medium according to claim 1, wherein the normal stiction force is about 25 to about 50 gf per interface; and the lateral stiction force is about 5 to about 10 gf per interface.

3. The magnetic recording medium according to claim 1, wherein in the textured landing zone comprises about 1,600 to about 40,000 protrusions per mm$^2$.

4. The magnetic recording medium according to claim 3, wherein the textured landing zone comprises about 4,500 to about 40,000 protrusions/mm$^2$.

5. The magnetic recording medium according to claim 4, wherein:

the protrusions have a diameter of about 3 $\mu$m to about 15 $\mu$m, and a height less than about 200 Å; and the lubricant topcoat has a thickness of about 15 Å to about 40 Å.

6. The magnetic recording medium according to claim 5, wherein:

the protrusions have a diameter of about 3 $\mu$m to about 8 $\mu$m; and a height less than about 150 Å; and the lubricant topcoat has a thickness of about 20 Å to about 30 Å.

7. The magnetic recording medium according to claim 1, comprising:

a non-magnetic substrate;

an underlayer on the non-magnetic substrate;

a magnetic layer on the underlayer;

a carbon-containing protective overcoat on the magnetic layer; and the lubricant topcoat on the protective overcoat; wherein, the textured landing zone is formed on the non-magnetic substrate by laser texturing and is substantially reproduced on the layers deposited thereon.

8. A disk drive comprising:

a read/write head; and the magnetic recording medium according to claim 1.

9. A disk drive comprising:

a read/write head in contact with a magnetic recording medium; and means for preventing the head from separating from the magnetic recording medium as a result of a substantially vertical force below about 25 gf per interface.

10. A method of manufacturing a magnetic recording medium, the method comprising:

laser texturing a non-magnetic substrate to form a landing zone comprising a plurality of protrusions; and depositing a lubricant topcoat, wherein the lubricant produces a normal stiction force in the textured landing zone greater than about 25 gf per interface and a lateral stiction force in the textured landing zone less than about 10 gf per interface.

11. The method according to claim 10, comprising controlling the density, height and/or diameter of the protrusions so that the normal stiction force is greater than about 25 gf per interface and the lateral stiction force is less than about 10 gf per interface.

12. The method according to claim 11, comprising sequentially:

depositing an underlayer on the non-magnetic substrate;

depositing a magnetic layer on the underlayer;

depositing a carbon-containing protective overcoat on the magnetic layer; and depositing the lubricant topcoat on the carbon-containing protective overcoat; wherein the textured landing formed on the non-magnetic substrate is substantially reproduced on the layers deposited thereon.

13. The method according to claim 11, comprising controlling the density, height and/or diameter of the protrusions so that the normal stiction force is about 25 to about 50 gf per interface, and the lateral stiction force is about 5 to about 10 gf per interface.

14. The method according to claim 11, comprising controlling laser texturing to form about 1,600 to about 40,000 protrusions per mm$^2$.

15. The method according to claim 14, comprising controlling laser texturing to form about 4,500 to about 40,000 protrusions/mm$^2$.

16. The method according to claim 15, comprising:

depositing the lubricant topcoat to a thickness of about 15 Å to about 40 Å; and controlling laser texturing to form protrusions having a diameter of about 3 $\mu$m to about 15 $\mu$m and a height less than about 200 Å.

17. The method according to claim 16, comprising:

depositing the lubricant topcoat at a thickness of about 20 Å to about 30 Å; and controlling laser texturing to form protrusions having a diameter of about 3 $\mu$m to about 8 $\mu$m and a height less than about 150 Å.

* * * * *